United States Patent
Hatanaka et al.

(10) Patent No.: US 9,390,849 B2
(45) Date of Patent: Jul. 12, 2016

(54) MAGNETIC ELEMENT FOR WIRELESS POWER TRANSMISSION AND POWER SUPPLY DEVICE

(75) Inventors: Takezo Hatanaka, Osaka (JP); Mitsuru Honjo, Osaka (JP); Takeshi Tanaka, Osaka (JP); Masami Inoue, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 819 days.

(21) Appl. No.: 13/583,525

(22) PCT Filed: Mar. 2, 2011

(86) PCT No.: PCT/JP2011/054770
§ 371 (c)(1),
(2), (4) Date: Sep. 7, 2012

(87) PCT Pub. No.: WO2011/111585
PCT Pub. Date: Sep. 15, 2011

(65) Prior Publication Data
US 2013/0002041 A1  Jan. 3, 2013

(30) Foreign Application Priority Data
Mar. 9, 2010  (JP) ................. 2010-052049

(51) Int. Cl.
*H02J 5/00* (2006.01)
*H01F 38/14* (2006.01)
*H02J 7/02* (2016.01)

(52) U.S. Cl.
CPC *H01F 38/14* (2013.01); *H02J 7/025* (2013.01)

(58) Field of Classification Search
CPC .................. H01F 38/14; H01F 27/24
USPC .......................................... 307/104
See application file for complete search history.

(56) References Cited

U.S. PATENT DOCUMENTS

| | | | | |
|---|---|---|---|---|
| 5,062,197 A | * | 11/1991 | Ngo et al. | 29/606 |
| 5,198,647 A | * | 3/1993 | Mizuta | G06K 19/07749 235/449 |
| 2008/0164844 A1 | * | 7/2008 | Kato | H01F 5/003 320/114 |
| 2010/0007215 A1 | | 1/2010 | Sakuma | |

(Continued)

FOREIGN PATENT DOCUMENTS

| CA | 2692247 A1 * | 12/2008 |
|---|---|---|
| CA | 2696247 A1 | 12/2008 |

(Continued)

OTHER PUBLICATIONS

Notice of Reasons for Rejection issued in counterpart JP Application No. 2011-045231, dated Jun. 25, 2013.

(Continued)

*Primary Examiner* — Thienvu Tran
*Assistant Examiner* — David M Stables
(74) *Attorney, Agent, or Firm* — Sughrue Mion, PLLC

(57) ABSTRACT

In the disclosed magnetic element (1) for wireless power transmission, in a cross section that matches the direction of magnetic coupling, a conductor section (2) and a magnetic material section (3) that abuts the conductor section (2) are disposed in parallel in a direction perpendicular to the direction of magnetic coupling, and one of either the conductor section (2) or the magnetic material section (3) has a protruding region (61) that protrudes in the direction of magnetic coupling more than the other does.

15 Claims, 9 Drawing Sheets

(56) References Cited

U.S. PATENT DOCUMENTS

| | | | |
|---|---|---|---|
| 2010/0181842 A1 | 7/2010 | Suzuki et al. | |
| 2010/0277004 A1 | 11/2010 | Suzuki et al. | |

FOREIGN PATENT DOCUMENTS

| | | | |
|---|---|---|---|
| EP | 1 947 660 A2 | 7/2008 | |
| JP | 57-97919 U | 6/1982 | |
| JP | 3-90371 U | 9/1991 | |
| JP | 09-082553 A | 3/1997 | |
| JP | 11-176677 A | 7/1999 | |
| JP | 2000-150238 A | 5/2000 | |
| JP | 2000-200725 A | 7/2000 | |
| JP | 2004-47700 A | 2/2004 | |
| JP | 2006-217731 A | 8/2006 | |
| JP | 2007-081239 A | 3/2007 | |
| JP | CA 2692247 A1 * | 12/2008 | H01F 38/14 |
| JP | 2010-41906 A | 2/2010 | |
| WO | 2008/156025 A1 | 12/2008 | |
| WO | 2009/081934 A1 | 7/2009 | |
| WO | 2011/030539 A1 | 3/2011 | |

OTHER PUBLICATIONS

Notification of First Office Action date Jun. 19, 2014, issued by the State Intellectual Property Office of China in corresponding Chinese Application No. 201180013298.4.

Extended European Search Report dated May 12, 2014 from the European Patent Office in counterpart European Patent Application No. 11753244.0.

Notification of Second Office Action dated Feb. 28, 2015 from the State Intellectual Property Office of the People's Republic of China in counterpart application No. 201180013298.4.

* cited by examiner

MAGNETIC ELEMENT FOR WIRELESS POWER TRANSMISSION AND POWER SUPPLY DEVICE

CROSS REFERENCE TO RELATED APPLICATIONS

This application is a National Stage of International Application No. PCT/JP2011/054770, filed on Mar. 2, 2011, which claims priority from Japanese Patent Application No. 2010-052049, filed on Mar. 9, 2010, the contents of all of which are incorporated herein by reference in their entirety.

TECHNICAL FIELD

The present invention relates to a magnetic element and a power supply device for wireless power transmission, which performs contactless power transmission with an action of electromagnetic induction.

BACKGROUND ART

There have been an increasing number of apparatuses such as an electric toothbrush or a cordless telephone, which are operated by cord-less power feeding. In the field of wall-hung television sets and personal computers, there has been development of apparatuses operated by contactless power feeding. Under such circumstances, there have traditionally been suggested and developed a magnetic element for wireless power transmission and a power supply device, each enabling power feeding with high transmission efficiency. For example, Patent document 1 suggests a structure to realize high transmission efficiency and downsizing, which includes a spiral planer coil buried on one side of a magnetic layer, a magnetic window arranged at the center portion of the planer coil, and the magnetic window at least partially structured by a magnetic material.

PRIOR ART DOCUMENT

Patent Document

[Patent document 1] Japanese Unexamined Patent Publication No. 47700/2004 (Tokukai 2004-47700)

DISCLOSURE OF THE INVENTION

Technical Problem

However, power supply with high transmission efficiency is required in structures other than the one described above, for feeding power to various apparatuses including those with a large power consumption.

The present invention is made in view of the above problem, and it is an object of the present invention to provide a magnetic element for wireless power transmission and a power supply device, each capable of feeding power with high transmission efficiency.

TECHNICAL SOLUTION

An aspect of the present invention is a magnetic element for wireless power transmission, which generates an induced electromotive force by magnetic coupling.

In a cross section that matches the direction of magnetic coupling, a plurality of conductor sections through which alternating current flows in a single direction and a magnetic material section provided in at least one gap between the conductor sections are arranged in parallel in a direction perpendicular to the direction of magnetic coupling; and each of the conductor sections or the at least one magnetic material section has one or more protruding regions which, or each of which, is a portion of conductor section protruding from the at least one magnetic material section in the direction of magnetic coupling, or a portion of the at least one magnetic material protruding from the conductor section in the direction of magnetic coupling.

This structure, when compared with a structure without the protruding regions, reduces a magnetic field around the conductor section which is not involved in magnetic coupling, and restrains expansion of the overall magnetic field. As a result, it is possible to raise the magnetic flux density at the time of magnetic coupling. The magnetic field generated by the flow of the alternating current in the conductor section interplays with another conductor section arranged, thereby generating an induced current. However, a phenomenon in which this induced current works as a resistance is restrained by the magnetic material section (protruding region) provided in a gap between the conductor sections. Thus, while the density of magnetic flux density is increased, the resistance caused by the induced current is reduced. This enables power feeding and power reception at high transmission efficiency, whether the magnetic element 1 is used on the magnetically-coupling side or on the magnetically-coupled side.

The aspect of the present invention may be adapted so that the one or more protruding regions are arranged on both sides of the magnetic element relative to the direction of magnetic coupling.

With the structure, the one or more protruding regions arranged on the other side relative to the direction of magnetic coupling exert the same function as the magnetic material provided in the direction of aligning the conductor sections arranged in parallel. Therefore, power feeding and power reception at even higher transmission efficiency is possible.

The aspect of the present invention may be adapted so that the one or more protruding regions are provided throughout the entire magnetic element in a direction of aligning the conductor sections.

In the structure, the protruding regions are provided to the entire magnetic element in the direction of aligning the conductor sections. This enables power feeding and power reception at even higher transmission efficiency.

The aspect of the present invention may be adapted so that the at least one magnetic material section is formed by a soft magnetism substance. The soft magnetism substance may be a metal magnetic substance. The metal magnetic substance may be an amorphous magnetic substance.

The above structure, with the protruding regions, enables power feeding and power reception at even higher transmission efficiency.

Another aspect of the present invention is a magnetic element for wireless power transmission including: a long conductor section; a long magnetic material section arranged in parallel to the conductor section so as to extend along the length of the conductor section; and a protruding region which is a width directional end portion of the conductor section protruding from the width directional end portion of the magnetic material section or a width directional end portion of the magnetic material section protruding from the width directional end portion of the conductor section.

This structure, when compared with a structure without the protruding regions, reduces a magnetic field around the conductor section which is not involved in magnetic coupling, and restrains expansion of the overall magnetic field. As a result, it is possible to raise the magnetic flux density at the time of magnetic coupling. The magnetic field generated by the flow of the alternating current in the conductor section interplays with another conductor section arranged, thereby generating an induced current. However, a phenomenon in which this induced current works as a resistance is restrained by the magnetic material section arranged in parallel to the conductor section. Thus, while the density of magnetic flux density is increased, the resistance caused by the induced current is reduced. This enables power feeding and power reception at high transmission efficiency, whether the magnetic element is used on the magnetically-coupling side or on the magnetically-coupled side.

Further, in the above magnetic element of the other aspect of the present invention for wireless power transmission, the conductor section and the magnetic material section may be combined so that the conductor section and the magnetic material section are at least partially integrated with each other while being electrically insulated.

With the above structure in which the conductor section and the magnetic material section are at least partially integrated by bonding with each other, the positional relation of the conductor section and the magnetic material section and the form of protruding regions are maintained as they are at the initial state, even when the conductor section and the magnetic material section are subjected to an external force as vibration or an impact. Thus, high transmission efficiency of the initial state is maintained for a long time. Further, when the conductor section generates heat, the heat of the conductor section is efficiently transferred to the magnetic material section via the portion where these sections are integrated. Therefore, the heat of the conductor section is efficiently released through the magnetic material section. This increases distribution of the electric energy, when compared to a case of separating the conductor section from the magnetic material section. As the result, the conductor section is kept from excessively heating while increasing the transmission quantity, simply by partially integrating the conductor section with the magnetic material section. Further, handling of the conductor section and the magnetic material section becomes easier by the integration. As a result, the magnetic element is easily stored and mounted to various apparatuses.

Further, in the above magnetic element of the other aspect of the present invention for wireless power transmission, the conductor section may have coating made of an electric insulator, and the magnetic material section is bonded with the coating so as to be integrated with the conductor section. That is, the conductor section may have coating made of an electric insulator and the magnetic material section is bonded with the coating.

With the above structure, a typical coil or the like having insulation coating may be adopted for the conductor section. Therefore, the magnetic element for wireless power transmission is easily obtained.

With the structure, a magnetic material section with an excellent thermal conductivity is easily obtained, and the conductor section and the magnetic material section are easily integrated with each other.

Another aspect of the present invention is a power supply device comprising a plurality of the above-described magnetic elements for wireless power transmission, wherein the magnetic elements for wireless power transmission are arranged so as to be flush with one another.

With the structure, it is possible to form a power supply device in the form of sheet, mat, or a plate, whose minimum thickness is the height of the magnetic element for wireless power transmission. Further, by two-dimensionally arranging the magnetic elements for wireless power transmission, it is possible to feed power to a power receiving device at the same conditions in any position within the power supply device.

ADVANTAGEOUS EFFECTS

With the present invention, power feeding at high transmission efficiency is possible.

BEST MODE FOR CARRYING OUT THE INVENTION (First Embodiment)

The following describes a first preferable embodiment of the present invention, with reference to the attached drawings.

(Magnetic Element 1 for Wireless Power Transmission)

Figure 1:
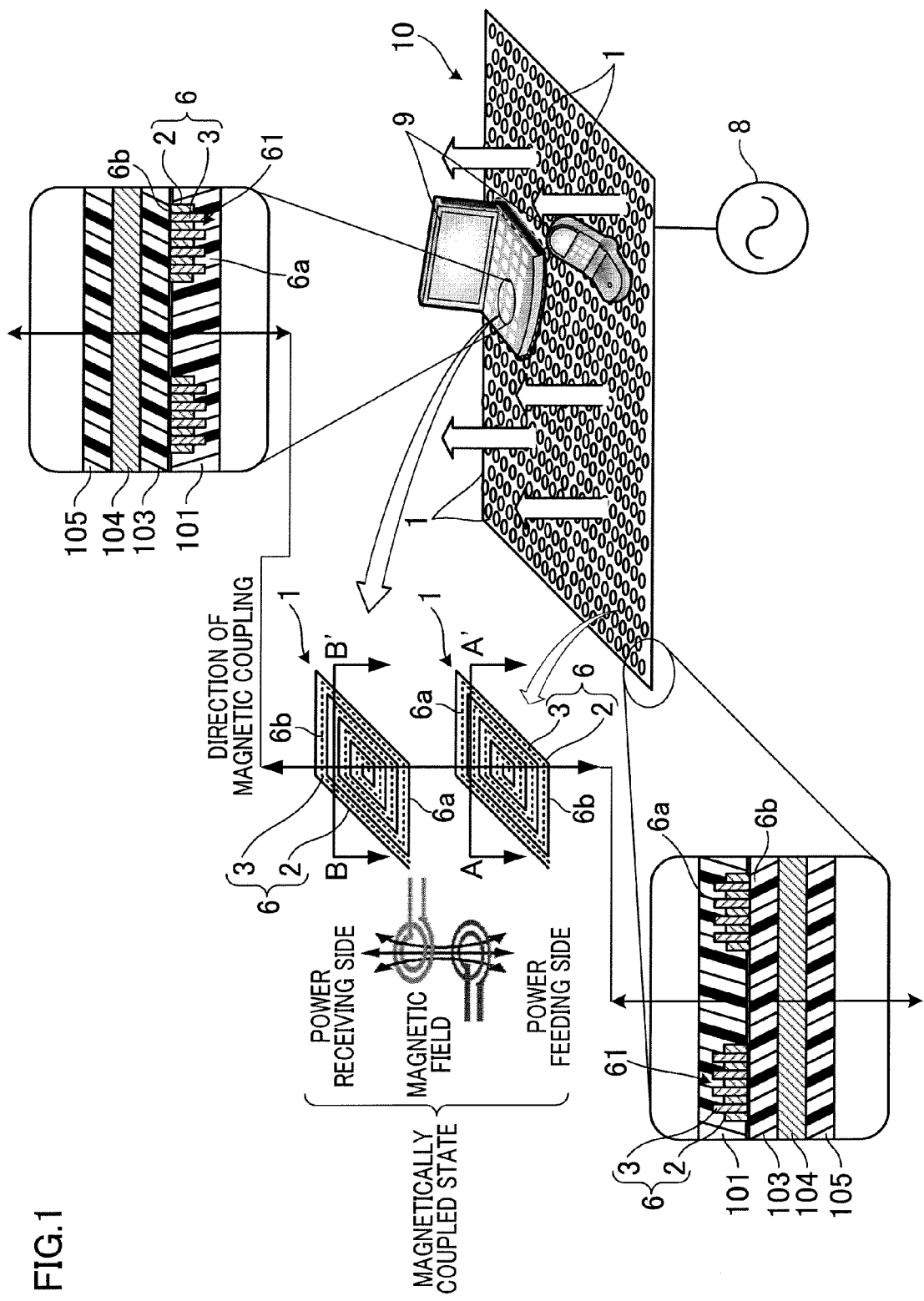
FIG. 1 is an explanatory diagram of a magnetic element for wireless power transmission and a power supply device related to a first embodiment of the present invention.

As shown in FIG. 1, a magnetic element 1 for wireless power transmission (hereinafter, simply referred to as magnetic element 1) is structured so as to cause an induced electromotive force by magnetic coupling and is usable for power feeding and power reception. Examples of such an element for power feeding include those for use in power supply devices 10 whose transmission power ranges from 0.1 W to 500 W and whose power transmission distance ranges from 1 mm to 10 cm. For example, the magnetic element 1 is applicable to a power supply device 10 for a wall-hung apparatus such as a wall-hanging thin television set, a power supply device 10 for a settled-type apparatus such as a personal computer and a mouse, a power supply device 10 for a small medical apparatus such as a pacemaker which is implanted in a human body, or the like. Note that the magnetic element 1 may be also applicable to a power supply device 10 whose transmission power and power transmission distance exceed those described above; e.g., a power supply device 10 for a robot or an electric vehicle.

On the other hand, Examples of the magnetic element 1 for power reception include those used in a wall-hung apparatus such as a wall-hanging thin television set, a settled-type apparatus such as a personal computer or a mouse, a small medical apparatus such as a pacemaker which is implanted in a human body, or the like, which are brought into contact with the power supply device 10. Further, the magnetic element 1 is applicable to a robot or an electric vehicle.

The magnetic element 1 used as described above is structured so that, in a cross section taken in a direction of magnetic coupling, there are conductor sections 2 and magnetic material sections 3 which are aligned in parallel and adjacent to one another in a direction perpendicular to the direction of magnetic coupling. Further, the magnetic element 1 has protruding regions 61 which are portions of the conductor sections 2 protruding from the magnetic material sections 3 in the direction of magnetic coupling, or portions of the magnetic material sections 3 protruding from the conductor sections 2 in the direction of magnetic coupling. In other words, the magnetic element 1 has the long conductor sections 2, the long magnetic material sections 3 aligned in parallel and adjacent to the conductor sections 2, and protruding regions 61 which are width directional end portions of the conductor sections 2 extending beyond the width directional end portions of the magnetic material sections 3 or width directional end portions of the magnetic material sections 3 extending beyond the width directional end portions of the conductor sections 2.

The above expression "direction of magnetic coupling" means a direction of a line connecting the center portions of the magnetic elements 1 on the magnetically-coupling side (power feeding side) and the magnetically-coupled side (power receiving side), when the magnetic elements 1 are arranged face to face so as to achieve a positional relation to cause the strongest magnetic coupling, thus generating the maximum induced electromotive force. Further, the "perpendicular direction" means substantially perpendicular.

Figure 2:
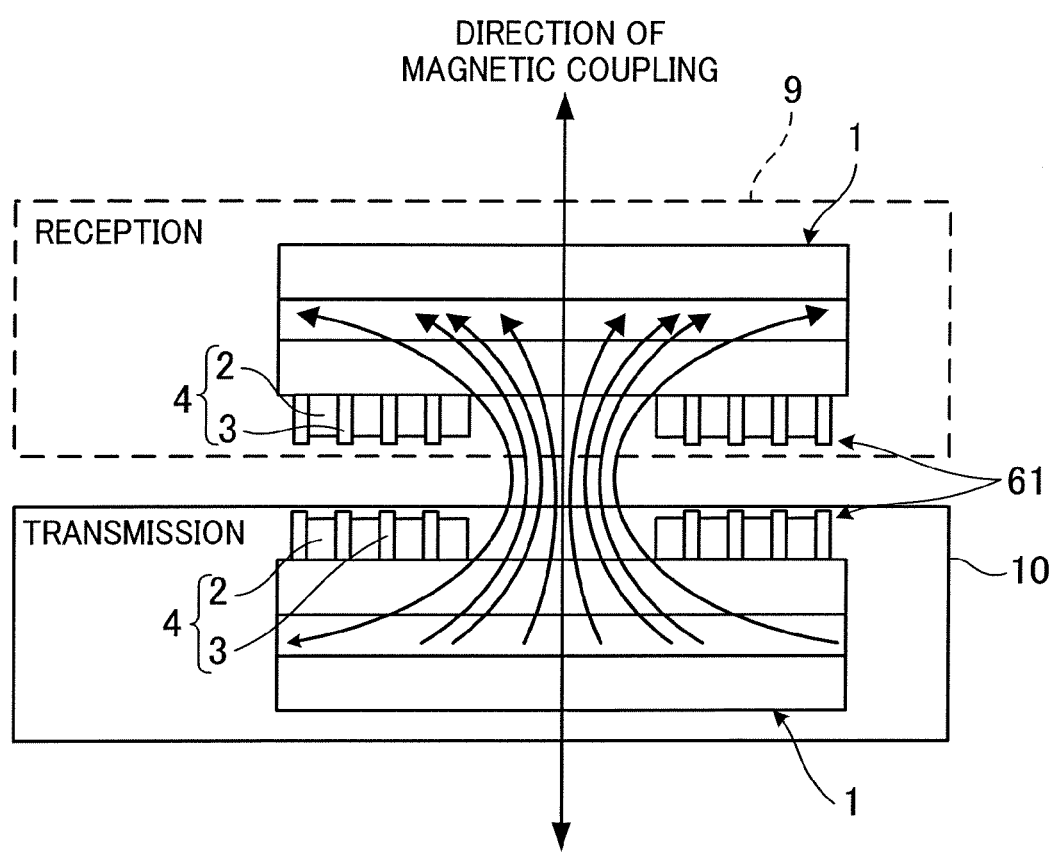
FIG. 2 is an explanatory diagram showing the state of a magnetic field.
Figure 3:
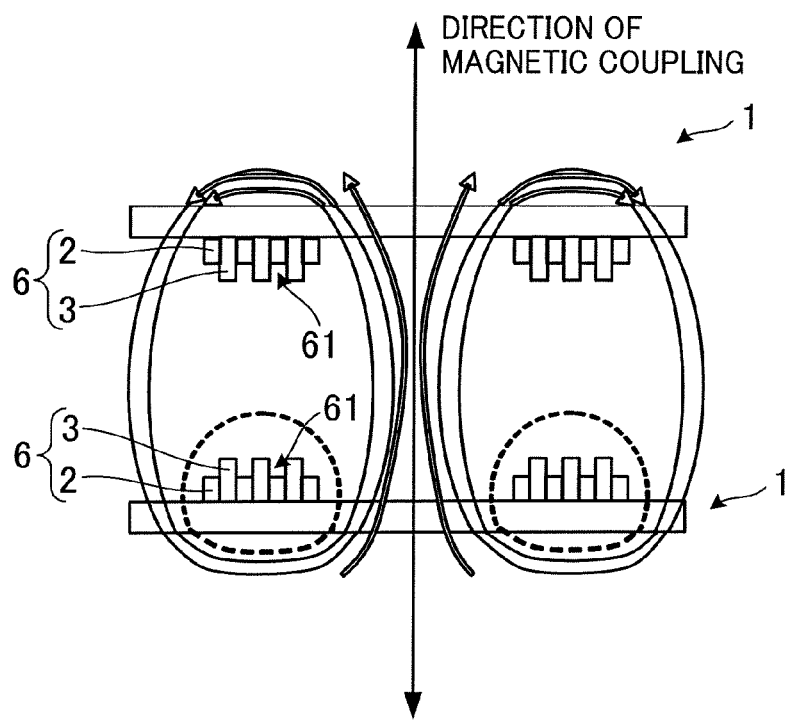
FIG. 3 is an explanatory diagram showing a state of the magnetic field.

As shown in FIG. 2 and FIG. 3, the magnetic element 1 structured as described above has the conductor sections 2, the magnetic material sections 3, and the protruding regions 61 which are portions of the conductor sections 2 protruding from the magnetic material sections 3 in the direction of magnetic coupling, or portions of the magnetic material sections 3 protruding from the conductor sections 2 in the direction of magnetic coupling. This structure, when compared to a structure without the protruding regions 61, reduces a magnetic field around the conductor section 2 which is not involved in magnetic coupling, and restrains expansion of the overall magnetic field. Thus, it is possible to increase the magnetic flux density at the time of magnetic coupling. Further, the magnetic element 1, whether it is on the magnetically-coupling side or on the magnetically-coupled side, achieves a high magnetic flux density. This enables power feeding and power reception with high transmission efficiency.

Further, the magnetic element 1 is structured so that, in the cross section taken in the direction of magnetic coupling, the plurality of conductor sections 2 are aligned in parallel to each other, and the magnetic material section 3 is provided in at least one gap between a plurality of the conductor sections 2 through which an alternating current flows in the same direction. Note that the magnetic element 1 is preferably structured so that the magnetic material section 3 is provided in all the gaps between the conductor sections 2 and that the conductor sections 2 and the magnetic material sections 3 are alternated. For example, a structure such that, in the cross section taken in the direction of magnetic coupling, an alternating current flows in the same direction through the plurality of conductor sections 2 is formed by winding the long conductor section 2 and the magnetic material section 3 from the inner to the outer circumferences, or by forming a plurality of conductor sections 2 and a plurality of magnetic material sections 3 in annular shapes sharing a single center point.

Figure 4:
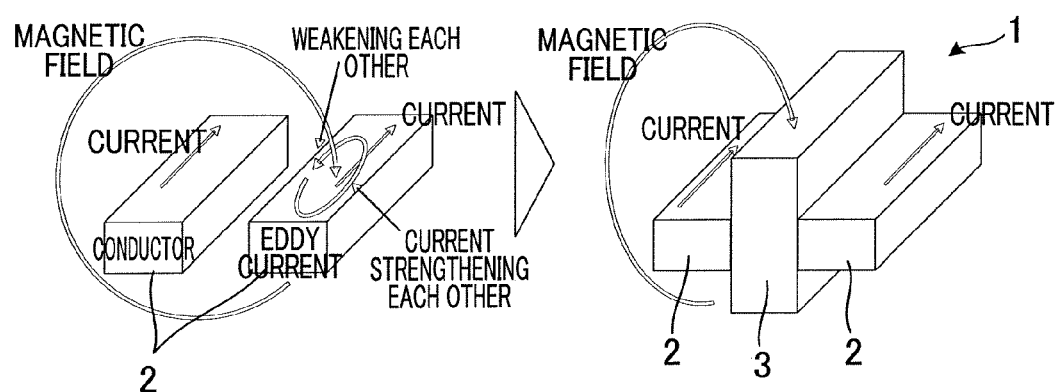
FIG. 4 is an explanatory diagram showing a state of the magnetic field.

As shown in FIG. 4, in the above structure, the magnetic field generated by the flow of the alternating current in the conductor section 2 interplays with another conductor section 2 arranged in parallel, thereby generating an induced current. However, a phenomenon in which this induced current works as a resistance is restrained by the magnetic material sections (protruding regions 61) provided in the gaps between conductor sections 2. Thus, while the density of magnetic flux density is increased, the resistance caused by the induced current is reduced. This enables power feeding and power reception at high transmission efficiency, whether the magnetic element 1 is used on the magnetically-coupling side or on the magnetically-coupled side.

In details, as shown in FIG. 1, the magnetic element 1 has a conductor-collected section 6. The conductor-collected section 6 has a flat plane shape and has a front surface 6a and a back surface 6b which serve as a magnetism releasing surface to face an apparatus on the power receiving side or on the power feeding side. Note that the conductor-collected section 6 may have any given two-dimensional shape. For example, when viewed from the above, the conductor-collected section 6 may have a triangular shape, quadrangular shape, a polygonal shape, an oval or a circular shape.

The conductor-collected section 6 has the long conductor section 2 and the long magnetic material section 3. The conductor section 2 and the magnetic material section 3 are spiraled at equal intervals from the inner circumference side to the outer circumference side. Thus, when viewing the vertical section of the conductor-collected section 6 taken in the direction of magnetic coupling (cross sections taken along the lines A-A', and a cross section taken along the line B-B'), the plurality of conductor sections 2 and the plurality of magnetic material sections 3 are arranged in parallel in the direction perpendicular to the direction of magnetic coupling.

On the inner circumference side of the conductor-collected section 6, a core section made of a magnetic material may be arranged. This concentrates the magnetic field to the inner circumference side of the conductor-collected section 6. Further, the magnetic element 1 may have the conductor-collected section 6 exposed to the outside. However, to protect the front surface of the conductor-collected section 6, the front surface 6a and the back surface 6b of the conductor-collected section 6 may have coating made of a protective material made of a non-magnetic and electric insulator; e.g., an insulative resin such as epoxy resin, polyimide resin, glass, or the like.

(Magnetic Material Section 3)

The magnetic material section 3 is made of a material having a high magnetic permeability. That is, the magnetic material section 3 may be made of a soft magnetism substance. The soft magnetism substance may be a metal magnetic substance. The metal magnetic substance may be an amorphous magnetic substance. Specifically, the magnetic material section 3 is formed by compacting magnetic powder with a resin. The magnetic powder is for example ferrite, sendust, an amorphous compound, or a magnetic substance having a fine crystal. Alternatively, the magnetic material section 3 may be formed by using a strip of ribbon obtained through a rapid solidification processing or the like or a magnetic film formed by conducting a vapor phase epitaxy such as spattering or vapor deposition on an insulative film. Further, the amorphous compound may be a Co based amorphous compound, an Fe based amorphous compound. The magnetic substance having the fine crystal may be an Fe based magnetic substance having a fine crystal of 300 Angstrom (0.03 μm). Further, the magnetic film formed by vapor phase epitaxy or plating may be a magnetic film based on CoZrNb, CoZrNbTa, FeBN, CoFeB—SiO, CoFeAlO, CoAlPdO, CoFeMn, CoFeN, FeNi, or the like.

The magnetic material section 3 has a width matching the direction of magnetic coupling and a thickness matching the direction of magnetic coupling (the radial direction of the conductor-collected section 6).

(Conductor Section 2)

The conductor section 2 has its ends relative to the length direction connected to a pair of not-shown terminals, respectively. In cases of adopting the magnetic element 1 in a power feeding apparatus such as a power supply device 10, each terminal is connected to a power supply unit 8. The power supply unit 8 is capable of supplying an alternated power of any given frequency to the conductor section 2. Meanwhile, incases of adopting the magnetic element 1 in a power receiving apparatus, each terminal is connected to a rectifier. The rectifier smoothens the alternated power formed through electromagnetic induction to a direct-power for use charging a battery, or for use in activating a driving apparatus.

The conductor section 2 is preferably formed by a metal material such as Cu or Al. The conductor section 2 is formed by vapor phase epitaxy, plating, or etching. The conductor section 2 has a width matching the direction of magnetic coupling and a thickness matching the direction of magnetic coupling (the radial direction of the conductor-collected section 6).

Note that, when the magnetic material section 3 is made by compacting powder of magnetic substance such as ferrite or amorphous compound by resin; i.e., if the magnetic material section 3 is insulative, the magnetic material section 3 and the conductor section 2 may be brought into contact with each other. On the other hand, when the magnetic material section 3 is made by compacting only an amorphous compound and therefore is conductive, an insulation layer needs to be disposed between the magnetic material section 3 and the conductor section 2. The insulation layer may be, for example, an insulative resin such as polyethylene terephthalate, or an inorganic insulative material such as an oxide.

(Protruding Region 61)

The magnetic element 1 has protruding regions 61 which are width directional end portions of the magnetic material sections 3 protruding from the conductor sections 2, or width directional end portions of the conductor sections 2 protruding from the magnetic material sections 3. The protruding regions 61 are provided throughout the entire front surface 6a of the conductor-collected section 6. Note that the protruding regions 61 may be provided to one of the front surface 6a and the back surface 6b of the conductor-collected section 6, or may be provided to a part of the front surface 6a and the back surface 6b. In other words, the protruding regions 61 are provided to at least apart of at least one of the front surface 6a and the back surface 6b of the conductor-collected section 6.

The protruding regions 61 are preferably the width directional end portions of the magnetic material sections 3 projecting from the width directional end portions of the conductor sections 2 so that the front surfaces of the magnetic material sections 3 and the side surfaces of the portions of the magnetic material section 3 protruding from the conductor sections 2 are exposed to outside. In other words, the protruding regions 61 are preferably such that the exposed surface of each magnetic material section 3 is increased. With the large exposed area, the magnetic material section 3 made of a highly magnetic-permeable material is easily affected by the magnetic field. This prevents a decrease in the occurrence efficiency of a magnetic field, which is attributed to the induced current generated by the magnetic field interplaying between adjacent conductor sections 2, as shown in FIG. 4. Note that the protruding regions 61 may be width directional end portions of the conductor section 2 protruding from the width directional end portions of the magnetic material section 3. In this case too, the magnetic material section 3 between adjacent conductor sections 2 prevents a decrease in the occurrence efficiency of a magnetic field which is attributed to the induced current generated between the conductor sections 2.

Where the width of each magnetic material section 3 is Dm and the width of each conductor section 2 is d, the protrusion length of the magnetic material sections 3 or the conductor section 2 is preferably such that Dm/d is 0.2 to 3.0. This is because too short a protrusion length causes difficulty in bringing about the effect of preventing a decrease in the occurrence efficiency of the magnetic field while too long a protrusion length causes mechanical problems such as interference of the protruding portions with each other.

(Power Supply Device 10)

The following deals with an application of the magnetic element 1 having the above described structure to a power feeding apparatus. As shown in FIG. 1, the magnetic element 1 is provided in the power supply device 10. The power supply device 10 is formed as a sheet so that one or more apparatuses 9 such as a mobile phone or a personal computer activated by cord-less power feeding is/are placeable. Throughout the entire surface of the power supply device 10 are arranged many magnetic elements 1. Note that the magnetic elements 1 is formed by etching or a printing process which jets materials in the liquid phase.

The magnetic elements 1 are two-dimensionally arranged at an even distribution density as in a case of a matrix. This achieves a function of supplying power at evenly high transmission efficiency, throughout the entire power supply device 10. Further, the power supply device 10 may have a plurality of placement regions each having a different distribution density of the magnetic elements 1 from the other regions. In this case, it is possible to adjust the power feeding amount based on the position of the apparatus 9. For example, when the apparatus 9 is a light emitting apparatus having a dimmer control function, the amount of light emitted can be adjusted by changing the position of the apparatus.

Further, each of the magnetic elements 1 is set so that the front surface 6a to serve as a magnetically releasing surface (magnetism releasing surface) matches with the top surface (placement surface) of the power supply device 10. Note that the magnetism releasing surface means the surface of the power feeding side or the power receiving side, and is at least one of the front surface 6a and the back surface 6b of the magnetic element 1.

The power supply device 10 includes: a placement layer 101 which directly contacts the apparatus 9 and which fixes and holds the conductor section 2 and the magnetic material section 3; a support layer 103 having the magnetic element 1; a shielding layer 104 provided on the lower surface of the support layer 103; and a protection layer 105 provided on the lower surface of the shielding layer 104. The placement layer 101, the support layer 103, and the protection layer 105 are made of a non-magnetic synthetic resin or the like. Further, the shielding layer 104 is made of at least one of a conductive material and a magnetic substance, and is structured to prevent leakage of a magnetic field from the lower side (back surface side) of the power supply device 10. Further, the support layer 103 has a not-shown power circuit substrate in the form of sheet. The power circuit substrate enables supplying of a high frequency alternated power from the power supply unit 8 to the magnetic element 1.

(Operation)

In the above structure, when the power supply device 10 having therein the magnetic elements 1 is connected to the power supply unit 8, and a high frequency alternating current (alternated power) is supplied to the device 10, each magnetic element 1 generates an alternating magnetic field. As shown in FIG. 2, each magnetic element 1 is structured so that, in the cross section taken in the direction of magnetic coupling, the magnetic material section 3 is provided at least one gap between the conductor sections 2 through which the alternating current flows in the same direction, and that each of the conductor sections 2 has a protruding region 61 protruding from the magnetic material section 3 in the direction of magnetic coupling or the magnetic material section 3 has a protruding region 61 protruding from the conductor sections 2 in the direction of magnetic coupling. Therefore, as shown in FIG. 3, the magnetic element 1, when compared with the structure without the protruding regions 61, reduces a magnetic field around the conductor section 2 which is not involved in magnetic coupling, and restrains expansion of the overall magnetic field. This structure of the magnetic element 1 increases the density of magnetic flux towards the apparatus 9 placed on the power supply device 10. Thus, the power supply device 10 with many magnetic elements 1 is capable of feeding power to the apparatus 9 at high transmission efficiency.

Further, as shown in FIG. 4, inside the magnetic element 1, the magnetic field generated by the flow of the alternating current in the conductor section 2 interplays with another adjacent conductor section 2, thereby generating an induced current. However, a phenomenon in which this induced current works as a resistance is restrained by the magnetic material sections 3 (protruding regions 61) provided in gaps between conductor sections 2. Thus, while the density of magnetic flux is increased, the resistance caused by the induced current is reduced. This enables power feeding at high transmission efficiency.

When the magnetic field is released from the front surfaces 6a serving as the magnetism releasing surfaces of all the magnetic elements 1 as described above, the power supply device 10 having these magnetic elements 1 outputs from its entire surface an alternating magnetic field of a frequency corresponding to the frequency of the alternated power. Accordingly, when the apparatus 9 which activates with an induced electromotive force is placed on the power supply device 10, the coil built in the apparatus 9 is magnetically coupled and interplays with the alternating magnetic field to generate an induced electromotive force, as shown in FIG. 2. The alternated power is then rectified and supplied to the control chip or the like. Note the apparatus 9 may include the magnetic element 1 for power reception, in which case power feeding at even a higher efficiency is possible.

(Modification)

Figure 5:
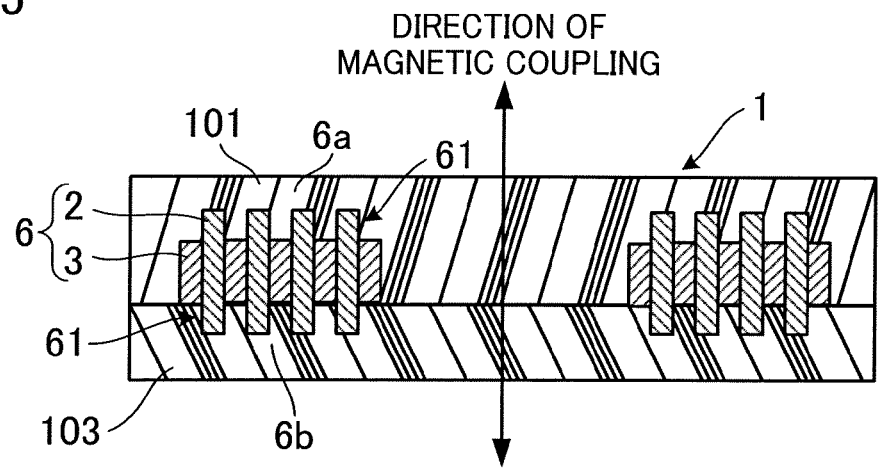
FIG. 5 is a cross sectional view of the magnetic element for wireless power transmission.
Figure 6:
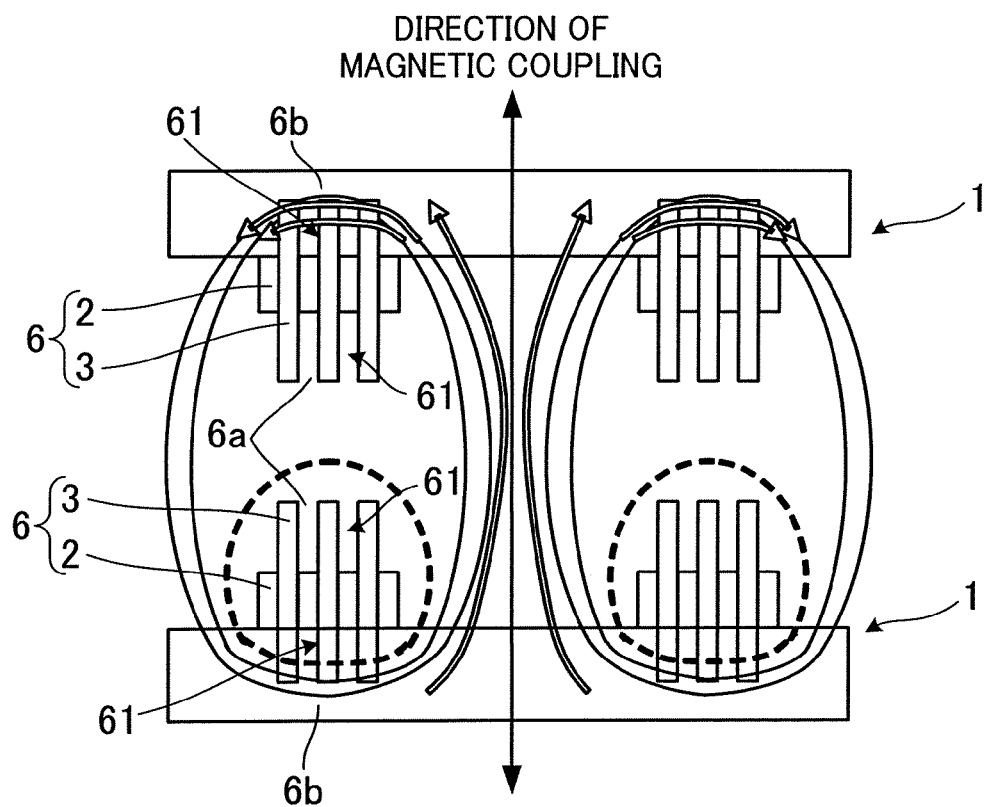
FIG. 6 is an explanatory diagram of the magnetic field.

As described, the present embodiment deals with a case where the magnetic element 1 is structured so that the protruding regions 61 are on the front surface 6a of the conductor-collected section 6, as shown in FIG. 1 and FIG. 3; however, the present invention is not limited to this structure. In other words, the magnetic element 1 may have the protruding regions 61 arranged on the front surface 6a and the back surface 6b as shown in FIG. 5. This structure of the magnetic element 1 increases the density of magnetic flux in the direction of magnetic coupling, as shown in FIG. 6.

Figure 7:
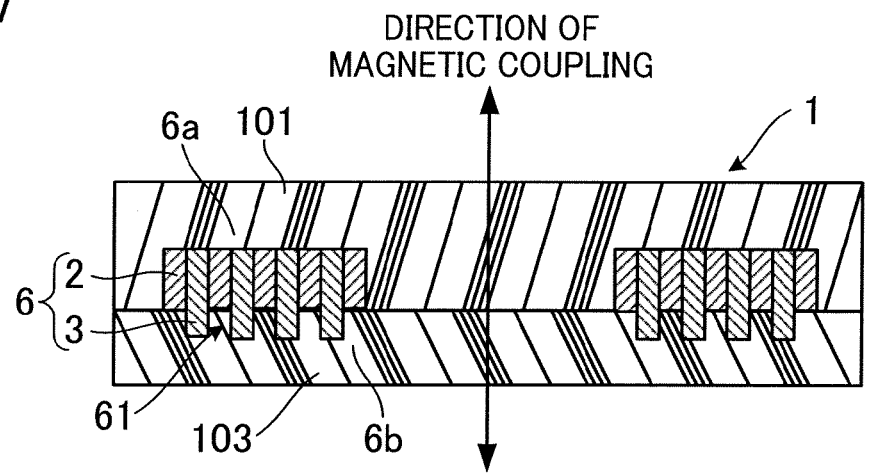
FIG. 7 is a cross sectional view of the magnetic element for wireless power transmission.
Figure 8:
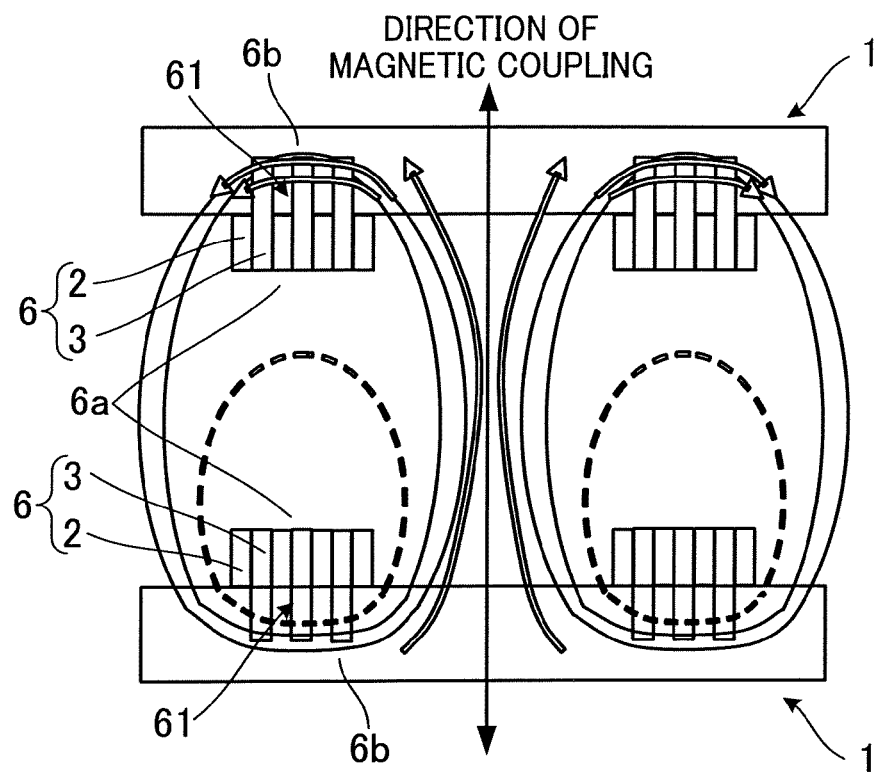
FIG. 8 is an explanatory diagram of the magnetic field.

Further, as shown in FIG. 7, the magnetic element 1 may have the protruding regions 61 arranged only on the back surface 6b which is opposite to the magnetism releasing surface. This structure of the magnetic element 1 also increases the density of magnetic flux in the direction of magnetic coupling, as shown in FIG. 8.

Further, the magnetic element 1 may have the protruding regions 61 arranged only on the inner circumference side of the conductor-collected section 6. Alternatively, the magnetic element 1 may have the protruding regions 61 on the outer circumference side of the conductor-collected section 6. Further, in the magnetic element 1, the protrusion length of the protruding regions 61 may be reduced from the inner circumference side to the outer circumference side of the conductor-collected section 6 so that the area of protrusion of the magnetic material section 3 on the inner circumference side is the largest. Further, the conductor sections 2 may have therebetween a plurality of magnetic material sections 3 spaced from each other. Alternatively, the magnetic material sections 3 may have therebetween a plurality of conductor sections 2 spaced from each other. Note that the magnetic element 1 may have a structure which is a combination of the above mentioned structures.

(Second Embodiment)

The following describes a second preferable embodiment of the present invention with reference to the attached drawings. Note that members that are identical to those described in the first embodiment are given the same reference numerals and no further explanation for these members is provided below.

(Magnetic Element 201 for Wireless Power Transmission)

Figure 9:
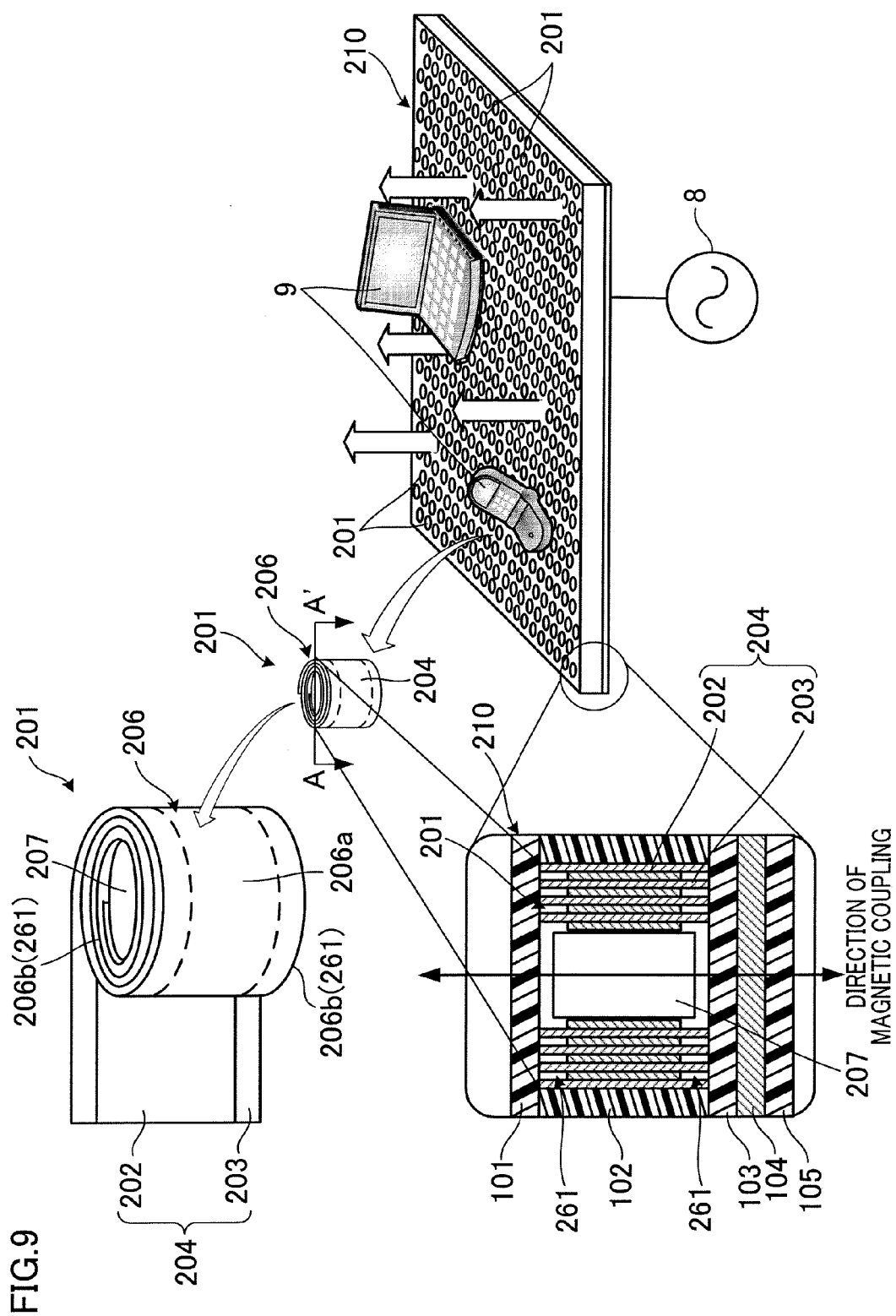
FIG. 9 is an explanatory diagram of a magnetic element for wireless power transmission and a power supply device related to a second embodiment of the present invention.

As shown in FIG. 9, a magnetic element 201 for wireless power transmission (hereinafter, simply referred to as magnetic element 201) of the present embodiment includes a roll 206 having a lamination 204 which includes a conductor layer 202 through which an alternating current flows; and a magnetic material layer 203 arranged parallel to the length of the conductor layer 202. The magnetic material layer 203 has width directional end portions protruding from the width directional end portions of the conductor layer 202, thus forming protruding regions 261. Note that the protruding regions 261 may be width directional end portions of the magnetic material layer 203 projecting from the width directional end portions of the conductor layer 202, or the width directional end portions of the conductor layer 202 projecting from the width directional end portions of the magnetic material layer 203.

In details, the magnetic element 201 has a roll 206. The roll 206 has a cylindrical outline, a side circumferential surface 206a, and end surfaces 206b on both ends of the side circumferential surface 206a. The end surfaces 206b each forms a magnetism releasing surface. Note that the roll 206 may have any given outline. For example, the roll 206 may be formed in the form of prism whose end surfaces 206b have a triangular shape, a quadrangular shape, or the like. The roll 206 is formed by winding several times the ribbon-like lamination 204. This way, in the vertical section of the roll 206 taken in the axial direction (cross section taken along the line A-A'), a plurality of lamination 204 are aligned in parallel to one another in a radial direction.

The lamination 204 is wound on the outer circumference of a cylindrical core member 207. The core member 207 may be a non-magnetic material or a magnetic material. However, the magnetic material is preferred, because the magnetic field is concentrated at the inner circumference side of the roll 206 wound around the core member 207. Note that the lamination 204 may be wound in a tubular manner, without the core member 207. Further, the shape of winding may be circular, oval, rectangular or any other given shape.

Figure 10:
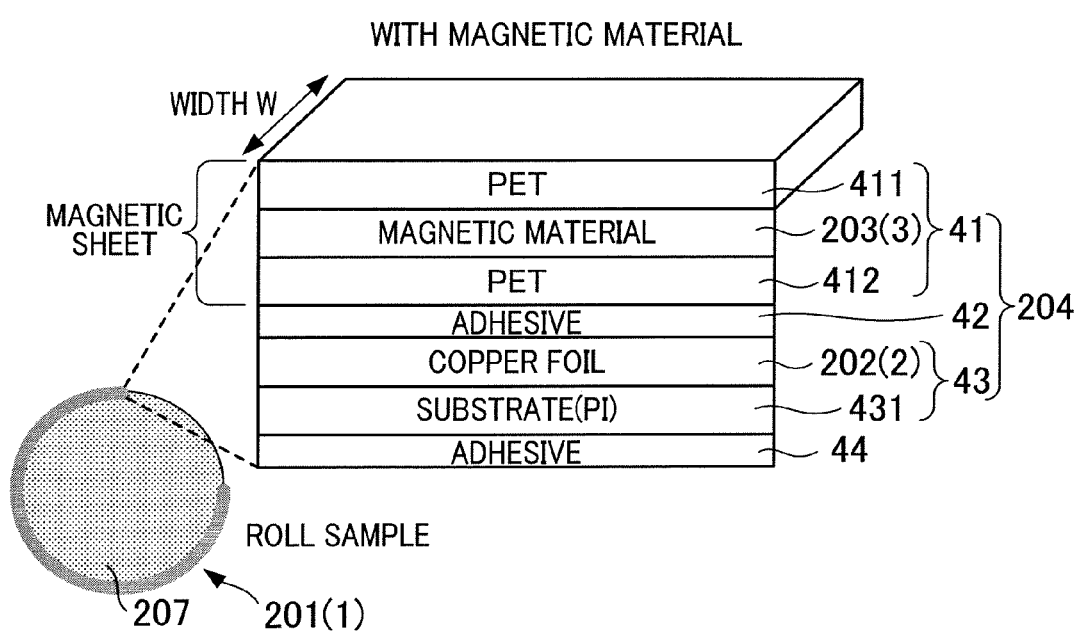
FIG. 10 is an explanatory diagram showing a structure of the magnetic element for wireless power transmission.

The lamination 204 has the conductor layer 202 and the magnetic material layer 203. The conductor layer 202 and the magnetic material layer 203 are parallel to each other. Specifically, as shown in FIG. 10, the lamination 204 includes: a magnetic sheet 41 having protection sheets 411 and 412 each made of Polyethylene Terephthalate (PET), which sandwich therebetween a magnetic material layer 203; and a conductive sheet 43 having a substrate 431 made of polyimide (PI) and a conductor layer 202 formed on the substrate 431.

The magnetic element 201 may have the roll 206 exposed to the outside. However, to protect the front surface of the roll 206, the side circumferential surface 206a and the end surfaces 206b of the roll 206 may have coating of a protective material made of a non-magnetic and electric insulator; e.g., an insulative resin such as epoxy resin, polyimide resin; glass; or the like. Further, to prevent interference of the adjacent magnetic material layers 203 with each other and to prevent deformation of the magnetic material layers 203 adjacent relative to the radial direction, the magnetic element 201 may have a protective material filled in between the magnetic material layers 203.

(Magnetic Material Layer 203)

The magnetic material layer 203 is made of the same material as the magnetic material section 3 of the first embodiment. The magnetic material layer 203 is formed in the form of belt whose width perpendicularly crosses the length of the roll 206, i.e., a direction of winding the roll 206 (circumferential direction), and a thickness matching a radial direction of the roll 206. The thickness of the magnetic material layer 203 is preferably 100 µm or less. In terms of the magnetic property, the thickness may exceed 100 µm. However, considering the winding, the thickness of the magnetic material layer is preferably 100 µm or less and more preferably 50 µm or less. The lower limit value of the magnetic material layer 203 is preferably 0.1 µm or more. This is because the magnetic layer of less than 0.1 µm in thickness could be too thin to achieve sufficient magnetic property. Further, manufacturing such a thin magnetic layer will require complicated controls. Therefore, the lower limit value of the thickness is preferably 0.1 µm. Considering the thickness of the magnetic layer, a preferable material is an amorphous compound which enables manufacturing ribbon through rapid solidification processing. In particular, a preferable magnetic property is achieved with a Co based amorphous compound.

(Conductor Layer 202)

The conductor layer 202 is made of the same material as the conductor section 2 of the first embodiment. The conductor layer 202 is preferably made of a metal material such as Cu, Al, or the like. The conductor layer 202 may be a thin film formed through a vapor phase epitaxy, plating, or the like, instead of forming the same in the form of ribbon.

(Protruding Region 261)

The magnetic element 201 has protruding regions 261. The protruding regions 261 are provided throughout the entire end surfaces 206b on both sides of the roll 206. Note that the protruding regions 261 may be provided to the end surface 206b of one side of the roll 206, or a part of the end surface 206b. In other words, the protruding regions 261 are provided to at least a part of at least one end surface 206b of the roll 206.

(Power Supply Device 210)

The magnetic element 201 structured as described above is provided to a power supply device 210 as shown in FIG. 9. The power supply device 210 is formed as a sheet or a plate so that one or more apparatuses 9 such as a mobile phone or a personal computer which activates with contactless power feeding is/are placeable. Throughout the entire surface of the power supply device 210 are buried many magnetic elements 201. The magnetic element 201 is arranged so that one of its end surfaces 206b, which serves as a magnetically releasing surface (magnetism releasing surface), is the top surface.

The power supply device 210 includes: a placement layer 101 which directly contacts the apparatus 9, a retaining layer 102 which fixes and holds the side circumferential surface 206a of the magnetic element 201, a support layer 103 supporting the end surface 206b to become the lower surface of the magnetic element 201, a shielding layer 104 provided on the lower surface of the support layer 103, and a protection layer 105 provided on the lower surface of the magnetic material layer 104. The placement layer 101, the retaining layer 102, the support layer 103, and the protection layer 105 are made of a non-magnetic synthetic resin. Further, the shielding layer 104 is made of at least one of a conductive material and a magnetic substance, and is structured to prevent leakage of a magnetic field from the lower side of the power supply device 210. Between the shielding layer 104 and the support layer 103 is provided a not-shown circuit board in the form of a sheet, which is connected to the inner circumference side and the outer circumference side of the conductor layer 202 of the magnetic element 201. The circuit board enables supplying of high frequency alternated power from the power supply unit 8 to the magnetic element 201.

Note that the magnetic element 1 (201) for wireless power transmission of the above first embodiment (second embodiment) may be structured so that the conductor section 2 (conductor layer 202) and the magnetic material section 3 (magnetic material layer 203) are at least partially integrated while being electrically insulated.

The electrically insulated state can be achieved by providing an insulator between the conductor section 2 (conductor layer 202) and the magnetic material section 3 (magnetic material layer 203). To provide an insulator, coating made of an insulative material is formed at least one of the conductor section 2 (conductor layer 202) and the magnetic material section 3 (magnetic material layer 203), through vapor deposition or plating, or an insulative sheet is interposed between the conductor section 2 (conductor layer 202) and the magnetic material section 3 (magnetic material layer 203). Further, the insulator and the magnetic material section 3 (magnetic material layer 203) have a higher thermal conductivity than the airspace.

With the above structure in which the conductor section 2 (conductor layer 202) and the magnetic material section 3 (magnetic material layer 203) are at least partially integrated, the positional relation of the conductor section 2 (conductor layer 202) and the magnetic material section 3 (magnetic material layer 203) and the form of protruding regions 61 (261) are maintained as they are at the initial state, even when the conductor section 2 (conductor layer 202) and the magnetic material section 3 (magnetic material layer 203) are subjected to an external force such as vibration or an impact. Thus, high transmission efficiency of the initial state is maintained for a long time.

Further, when the conductor section 2 (conductor layer 202) generates heat, the heat of the conductor section 2 (conductor layer 202) is efficiently transferred to the magnetic material section 3 (magnetic material layer 203) via the portion where these sections are integrated. Therefore, the heat of the conductor section 2 (conductor layer 202) is efficiently released through the magnetic material section 3 (magnetic material layer 203). This increases distribution of the electric energy, when compared to a case of separating the conductor section 2 (conductor layer 202) from the magnetic material section 3 (magnetic material layer 203). As the result, the conductor section 2 (conductor layer 202) is kept from excessively heating while increasing the transmission quantity, simply by partially integrating the conductor section 2 (conductor layer 202) with the magnetic material section 3 (magnetic material layer 203). Further, handling of the conductor section 2 (conductor layer 202) and the magnetic material section 3 (magnetic material layer 203) becomes easier by the integration. As a result, the magnetic element 1 (201) is easily stored and mounted to various apparatuses.

Further, in the magnetic element 1 (201) of the first embodiment (second embodiment), the conductor section 2 (conductor layer 202) may have coating made of an electric insulator, and the magnetic material section 3 (magnetic material layer 203) may be bonded with the coating so as to be integrated with the conductor section 2 (conductor layer 202). That is, the conductor section 2 (conductor layer 202) may have coating made of an electric insulator and the magnetic material section 3 (magnetic material layer 203) may be bonded with the coating.

With the above structure, a typical coil or the like having insulation coating may be adopted for the conductor section 2 (conductor layer 202). Therefore, the magnetic element 1 (201) is easily obtained. Further, it is possible to obtain an effect similar to that obtained from the rolled coil having a wound shape explained in the above embodiment.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. To fully understand the object and effects of the present invention, it is strongly encouraged to sufficiently refer to disclosures of documents already made available.

EXAMPLE

In examples 1 to 3 below, a transmission status of a magnetic element 201 having the protruding regions 261 was measured. In comparative examples 1 and 2 below, a transmission status of a magnetic element without the protruding regions 261 was measured.

Example 1

Specifically, as in the case of FIG. 10, a magnetic sheet 41 was prepared by interposing a magnetic material layer 203 of 18 μm between protection sheets 411 and 412. The magnetic sheet 41 was made of mainly an amorphous magnetic alloy. Each of the protection sheets 411 and 412 was polyethylene terephthalate of 50 μm. Further, a conductive sheet 43 was prepared by forming, on a substrate 431 made of polyimide of 25 μm, a conductor layer 202 made of a copper foil of 35 μm.

Next, the magnetic sheet 41 was cut out in a size of 7 mm (W)×300 mm (L). The conductive sheet 43 was cut out in a size of 5 mm (W)×300 mm (L). One end of the magnetic sheet 41 and one end of the conductive sheet 43 were aligned so that the other end of the magnetic sheet 41 protrudes from the other end of the conductive sheet 43 by 2 mm. Then the both sheets 41 and 43 were bonded by an adhesive layer of 20 μm, thus preparing a lamination 204. An adhesive was applied on the substrate 431 side of the lamination 204 to form an adhesive layer 42 of 20 μm. The lamination 204 was then wound 6.5 times about a cork-made core member 207 of 13 mmϕ in diameter. Thus, a roll 206 having protruding regions 261 on one side was formed. Then one end of a signal line was connected to an end portion on the inner circumference sides of the conductor layer 202 of the roll 206 and one end of another signal line was connected to the outer circumference side of the conductor layer 202 of the roll 206.

Two rolls 206 were prepared as described above and were arranged symmetrically on the right and left so that the respective sides of the rolls 206 on which the magnetic sheets 41 protruded by 2 mm faced each other. In other words, the rolls 206 were arranged so that the protruding regions 261 of the rolls 206 faced each other. At this time, the conductor layers 202 facing each other were spaced 5 mm away from each other. Further, the rolls 206 were held so that the core of the rolls 206 were concentric. Then, the other ends of the signal lines having the one ends connected to the rolls 206 were connected to a terminal 1 and a terminal 2 of Network Analyzer (Agilent Technologies Inc.), respectively, and the insertion loss of S parameter (S21) was measured at measurement frequency of 300 kHz, 500 kHz, and 1000 kHz. Note that the "S21" means signals passing through the terminal 2, when signals are input to the terminal 1. S21 is expressed in decibel and the greater the value, the higher the transmission efficiency.

Example 2

Two rolls 206 were prepared as described in the example 1 and were symmetrically arranged on the left and right so that the sides of the rolls 206 on which the edges of the magnetic sheet 41 and the conductive sheet 43 were aligned faced each other. In other words, the rolls 206 were arranged so that the protruding regions 261 of the rolls 206 did not face each other. At this time, the conductor layers 202 facing each other were spaced 5 mm away from each other. Then, under the same conditions as the example 1, the insertion loss of S parameter (S21) was measured at measurement frequencies of 300 kHz, 500 kHz, and 1000 kHz.

Example 3

Next, a magnetic sheet 41 prepared as described in the example 1 was cutout in a size of 9 mm (W)×300 mm (L). Further, a conductive sheet 43 same as that of example 1 was cut out in a size of 5 mm (W)×300 mm (L). Then, a lamination 204 was prepared by aligning the middle portions of the magnetic sheet 41 and the conductive sheet 43 so that the both ends of the magnetic sheet 41 protruded from the copper foil by 2 mm. The lamination 204 was then wound 6.5 times about a cork-made core member 207 of 13 mmϕ in diameter. Thus, a roll 206 having protruding regions 261 on both sides was formed.

Two rolls 206 were prepared as described above and were symmetrically arranged on the left and right so that one side of each roll 206 faced each other. At this time, the conductor layers 202 facing each other were spaced 5 mm away from each other. Then, under the same conditions as the example 1, the insertion loss of S parameter (S21) was measured at measurement frequencies of 300 kHz, 500 kHz, and 1000 kHz.

Comparative Example 1

Next, a magnetic element 100 having no protruding region 261 was prepared. That is, a magnetic sheet 41 and a conductive sheet 43 were prepared as described in example 1 and were cut out in a size of 5 mm (W)×300 mm (L). Then, a lamination 204 was formed by laminating the magnetic sheet 41 and the conductive sheet 43 so that the both end surfaces of these sheets were aligned. The lamination 204 was then wound about a cork-made core member 207 of 13 mmφ in diameter, thus forming a roll 206. Two rolls 206 were formed this way and were symmetrically arranged on the left and right so that one side of each roll 206 faced each other. At this time, the conductor layers 202 facing each other were spaced 5 mm away from each other. Then, under the same conditions as the example 1, the insertion loss of S parameter (S21) was measured at measurement frequencies of 300 kHz, 500 kHz, and 1000 kHz.

Comparative Example 2

Figure 11:
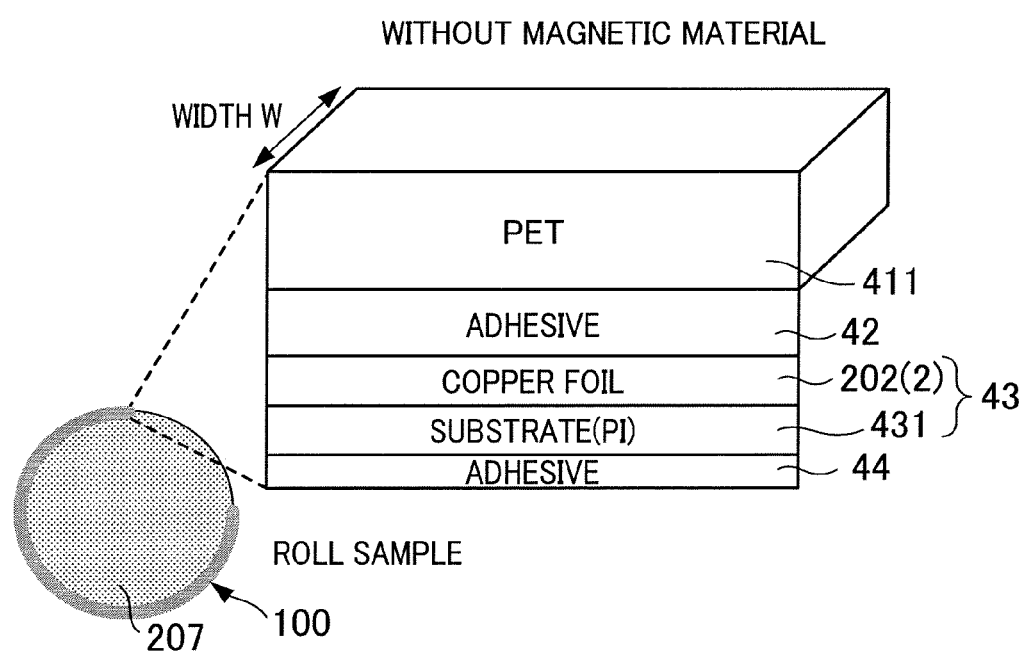
FIG. 11 is an explanatory diagram showing a structure of the magnetic element for wireless power transmission.

Next, as shown in FIG. 11, a magnetic element 100 having no magnetic material layer 203 was prepared. That is, instead of the magnetic sheet 41 of example 1, there was formed a lamination 204 having a protection sheet 411 having the same thickness as the magnetic sheet 41. The lamination 204 was then wound about a cork-made core member 207 of 13 mmφ in diameter, thus forming a roll 206. Two rolls 206 were formed this way and were symmetrically arranged on the left and right so that one side of each roll 206 faced each other. At this time, the rolls 206 were spaced 5 mm away from each other. Then, under the same conditions as the example 1, the insertion loss of S parameter (S21) was measured at measurement frequencies of 300 kHz, 500 kHz, and 1000 kHz.

(Measurement Results of Examples 1 to 3 and Comparative Examples 1 and 2)

Figure 12:
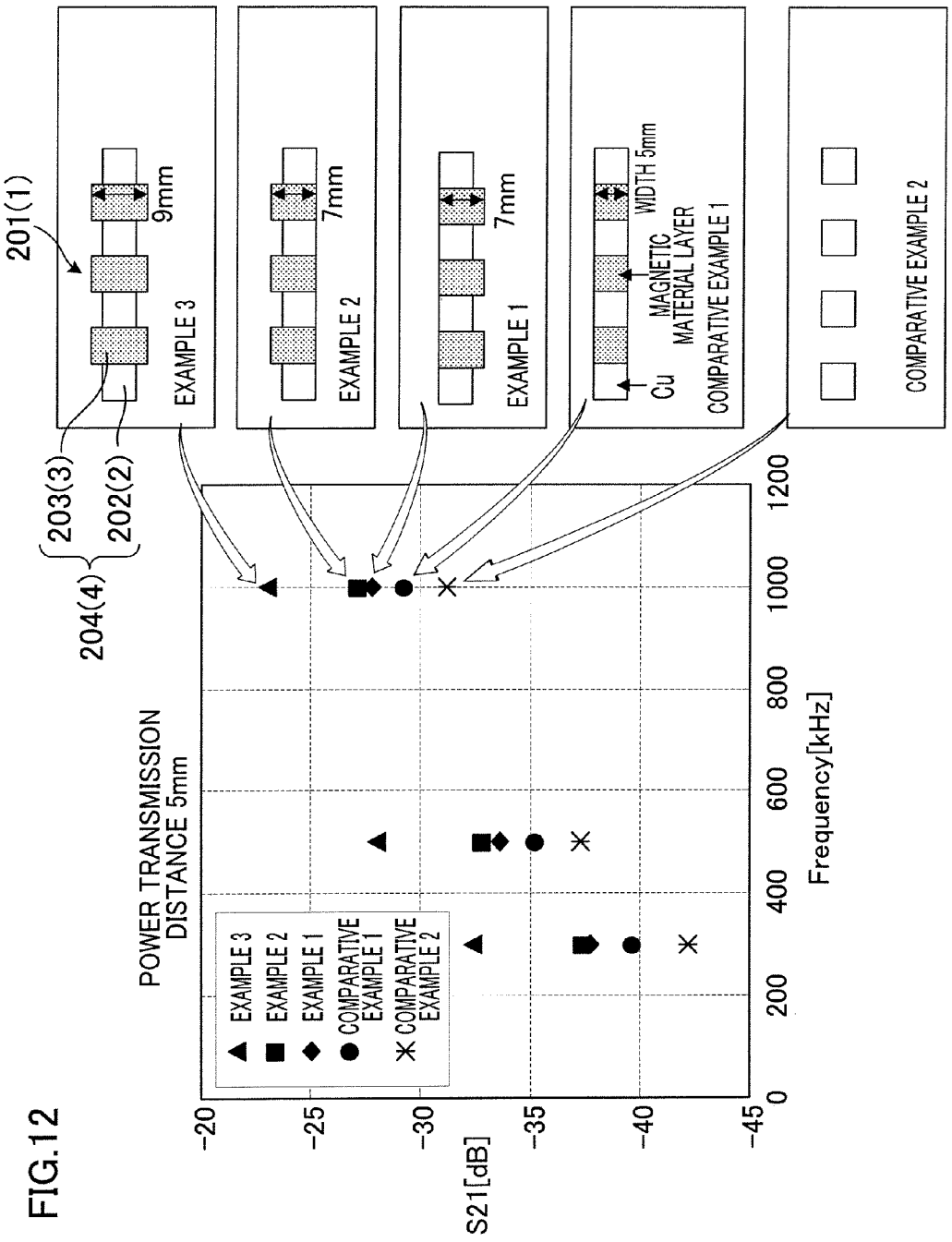
FIG. 12 is an explanatory diagram showing the measurement results of examples 1 to 3, and comparative examples 1 and 2.

The insertion losses (S21) of S parameter resulting from the above measurements are shown in Table 1 below and in FIG. 12.

TABLE 1

| Freq. (kHz) | Example 1 S21 (db) | Example 2 S21 (db) | Example 3 S21 (db) | Comparative Example 1 S21 (db) | Comparative Example 2 S21 (db) |
|---|---|---|---|---|---|
| 300 | −37.72 | −37.37 | −32.41 | −39.63 | −42.23 |
| 500 | −33.56 | −32.77 | −28.01 | −35.18 | −37.30 |
| 1000 | −27.75 | −27.08 | −23.00 | −29.24 | −31.15 |

From the measurement result, the examples 1 to 3 having the protruding regions 261 are found to result in higher transmission efficiencies than those resulting from the comparative example 1 having no protruding regions 261 and the comparative example 2 having no magnetic material layer 203. Based on this, the transmission efficiency of the magnetic element 201 is found to be increased with the protruding regions 261, which are the portions of the magnetic material layer 203 protruding from the conductor layer 202.

Further, the rolls 206 of example 3 having the protruding regions 261 on both sides are found to achieve higher transmission efficiencies than the rolls 206 of examples 1 and 2 having the protruding regions 261 on one side. Further, the example 2 in which the protruding regions 261 of the rolls 206 do not face each other is found to achieve higher transmission efficiencies than example 1 in which protruding regions 261 of the rolls 206 face each other. From the above findings, there are clarified that, to improve the transmission efficiency, it is important to arrange protruding regions 261 on both sides having the magnetism releasing surface, and that the transmission efficiency can be improved even without the protruding regions 261 on the side of the magnetism releasing surface.

REFERENCE NUMERALS

1 Magnetic Element for Wireless Power Transmission
2 Conductor Section
3 Magnetic material Section
6 Conductor-Collected Section
8 Power Supply Device
9 Apparatus
10 Power Supply Device
61 Protruding Region
201 Magnetic Element for Wireless Power Transmission
202 Conductor Layer
203 Magnetic material Layer
204 Lamination

The invention claimed is:

1. A magnetic element for wireless power transmission, which generates an induced electromotive force by magnetic coupling, wherein:
   in a cross section in a direction of the magnetic coupling, alternating conductor sections adapted to conduct an alternating current and magnetic material sections are arranged in parallel in a direction perpendicular to the direction of the magnetic coupling, wherein the conductor sections and the magnetic material sections are spiraled from an inner circumference side to an outer circumference side; and
   each of the conductor sections has at least one region protruding from the magnetic material section in the direction of the magnetic coupling, or each of the magnetic material sections has at least one region protruding from the conductor section in the direction of the magnetic coupling.

2. The magnetic element for wireless power transmission according to claim 1, wherein the one or more protruding regions are arranged on both sides of the magnetic element relative to the direction of the magnetic coupling.

3. The magnetic element for wireless power transmission according to claim 2, wherein the one or more protruding regions are provided throughout the entire magnetic element in a direction of aligning the conductor sections.

4. The magnetic element for wireless power transmission according to claim 3, wherein the magnetic material section is formed by a soft magnetism substance.

5. The magnetic element for wireless power transmission according to claim 4, wherein the soft magnetism substance is a metal magnetic substance.

6. The magnetic element for wireless power transmission according to claim 5, wherein the metal magnetic substance is an amorphous magnetic substance.

7. The magnetic element for wireless power transmission according to claim 4, wherein the conductor sections and the magnetic material section are combined so that the conductor sections and the magnetic material section are at least partially integrated with each other while being electrically insulated.

8. The magnetic element for wireless power transmission according to claim 7, wherein the conductor sections have coating made of an electric insulator, and the magnetic material section is bonded with the coating.

9. The magnetic element for wireless power transmission according to claim 1, wherein the one or more protruding regions are provided throughout the entire magnetic element in a direction of aligning the conductor sections.

10. The magnetic element for wireless power transmission according to claim 1, wherein the magnetic material section is made of an amorphous magnetic substance.

11. The magnetic element for wireless power transmission according to claim 1, wherein the conductor sections and the magnetic material section are combined so that the conductor sections and the magnetic material section are integrated with each other while being electrically insulated.

12. A power supply device comprising a plurality of magnetic elements according to claim 1, for wireless power transmission, wherein the magnetic elements for wireless power transmission are arranged so as to be flush with one another.

13. A magnetic element for wireless power transmission, comprising:
   a pair of conductor sections;
   a magnetic material section arranged between the pair of conductor sections in parallel to the conductor sections so as to extend along the length of the conductor section in a direction perpendicular to the direction of the magnetic coupling;
   wherein the conductor section and the magnetic material section are spiraled at equal intervals from an inner circumference side to an outer circumference side, and
   wherein the conductor section has a region at a width directional end portion protruding from the width directional end portion of the magnetic material section or the magnetic material section has a region at a width directional end portion protruding from the width directional end portion of the conductor section.

14. The magnetic element for wireless power transmission according to claim 13, wherein the conductor section and the magnetic material section are combined so that the conductor section and the magnetic material section are at least partially integrated with each other while being electrically insulated.

15. The magnetic element for wireless power transmission according to claim 14, wherein the conductor section has coating made of an electric insulator and the magnetic material section is bonded with the coating.

* * * * *